(No Model.)
J. MARKS.
BICYCLE SUPPORT.
No. 506,600. Patented Oct. 10, 1893.
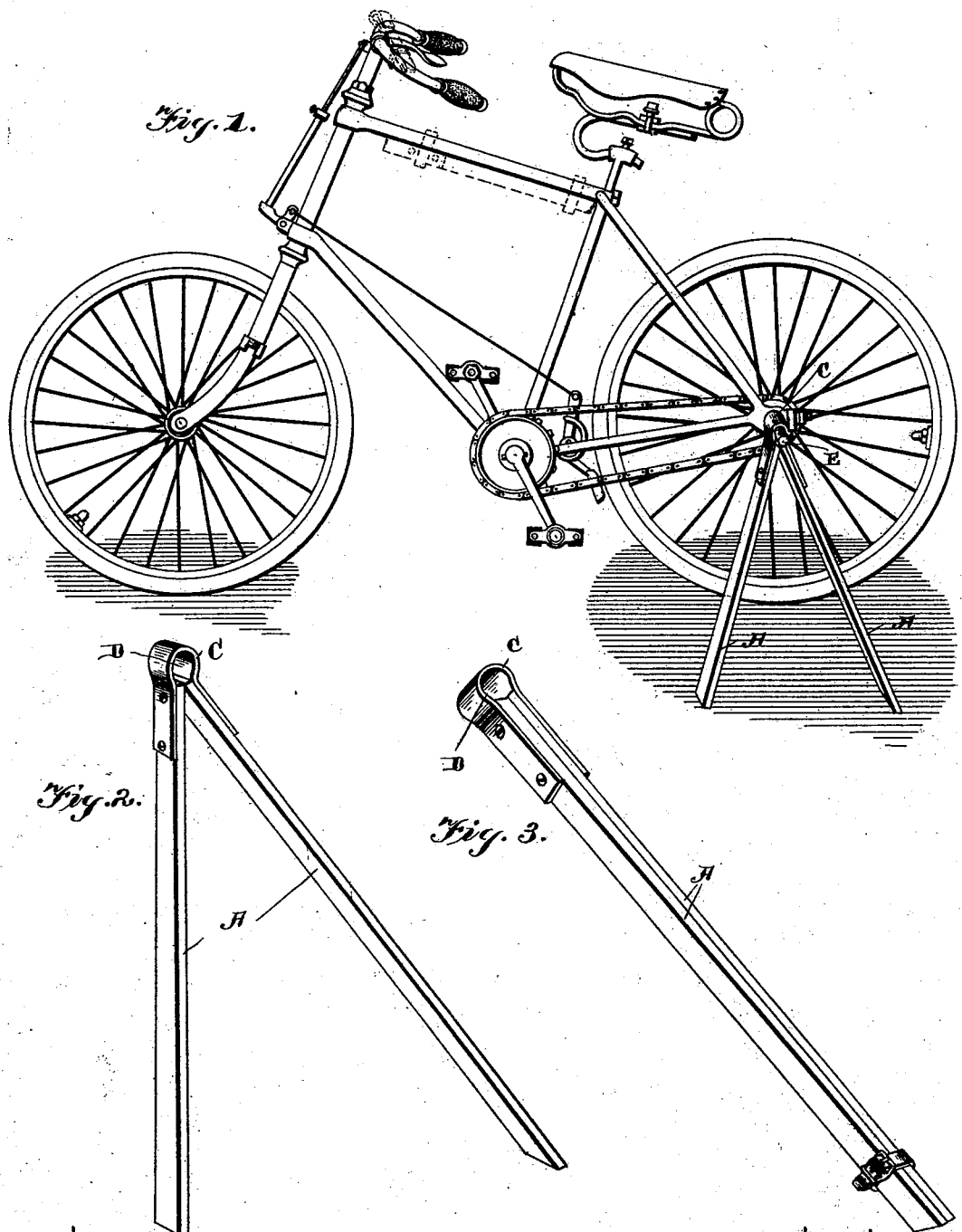
Witnesses
Geo. E. Frech.
Roland A. Fitzgerald
Inventor
James Marks,
by Lehmann Pattison & Nesbit
attys.

UNITED STATES PATENT OFFICE.

JAMES MARKS, OF BAYONNE, NEW JERSEY.

BICYCLE-SUPPORT.

SPECIFICATION forming part of Letters Patent No. 506,600, dated October 10, 1893.

Application filed April 27, 1893. Serial No. 472,058. (No model.)

*To all whom it may concern:*

Be it known that I, JAMES MARKS, of Bayonne, in the county of Hudson and State of New Jersey, have invented certain new and useful Improvements in Bicycle-Supports; and I do hereby declare the following to be a full, clear, and exact description of the invention, such as will enable others skilled in the art to which it pertains to make and use it, reference being had to the accompanying drawings, which form part of this specification.

My invention relates to an improvement in bicycle supports, and the object of the same is to provide a simple device which may be applied to the machine for supporting the same when at a stand still, and which device when not in use may be folded and strapped longitudinally with the handle bar or other parts of the machine, so as to occupy very little room.

Referring to the accompanying drawings: Figure 1, is a perspective view of a bicycle provided with my improved support. Fig. 2, is a detached perspective view of the support. Fig. 3, is a view of the same when folded.

The support consists of the two legs A which are cut at an angle at their lower ends so as to stand in an inclined position.

C is a bow spring connected at its ends to the outer sides of the legs and formed between its ends with the curved loop or bow D, which is adapted to grasp tightly the step E of a bicycle when slipped thereover. The spring impinges sufficiently the step to hold the supporter in position so that when in use the support is substantially rigid with the machine. The spring is sufficiently strong to hold the lower ends of the legs normally separated and their upper ends together as shown in Fig. 2. The loop or bow D is so arranged with relation to the legs as to occupy a horizontal position while the support is standing at an incline. When the support is not in use it may be bound together as shown in Fig. 3, and strapped or otherwise secured to the handle bar, as shown in dotted lines in Fig. 1. It may also be conveniently strapped to other portions of the machine frame, if so desired.

I here show and describe the loop or bow D as forming the arc of a circle in order to fit a circular machine step. It is evident, however, that the same may be made flat upon its upper side to properly fit a flat step or the whole may be made substantially square for a step of that shape.

Having thus fully described my invention, what I claim as new, and desire to secure by Letters Patent, is—

1. An improved bicycle support comprising two legs, a spring for holding their upper ends normally together and their lower ends separated, and a means for attaching the same to a machine, substantially as shown and described.

2. An improved bicycle support comprising two legs diverging from their upper ends, a spring for holding them normally in this position and forming a loop for engaging the machine step, substantially as shown and described.

3. An improved bicycle support comprising a bow spring which is adapted to partially encircle the step of a machine, and legs secured to the ends of the said bow, substantially as shown and described.

4. An improved bicycle support comprising inclined legs, a spring connecting their upper ends, and a horizontal bow formed by the said spring which is adapted to engage the step of the machine, substantially as shown and described.

In testimony whereof I affix my signature in presence of two witnesses.

JAMES MARKS.

Witnesses:
C. M. COLVILLE,
A. C. HERZOG.